United States Patent [19]
Speth

[11] 4,178,521
[45] Dec. 11, 1979

[54] BASE DRIVE CIRCUIT
[75] Inventor: William R. Speth, Columbus, Ohio
[73] Assignee: International Telephone and Telegraph Corporation, New York, N.Y.
[21] Appl. No.: 851,123
[22] Filed: Nov. 14, 1977
[51] Int. Cl.$^2$ .................. H03K 17/60; H03K 1/00
[52] U.S. Cl. .................................. 307/270; 307/255; 307/300
[58] Field of Search ............... 307/300, 314, 275, 270, 307/254, 255

[56] References Cited

U.S. PATENT DOCUMENTS

| | | | |
|---|---|---|---|
| 3,852,620 | 12/1974 | Milberger et al. | 307/300 |
| 3,999,086 | 12/1976 | Ekelund | 307/300 |

Primary Examiner—Stanley D. Miller, Jr.
Assistant Examiner—B. P. Davis
Attorney, Agent, or Firm—James B. Raden; Donald J. Lenkszus

[57] ABSTRACT

A direct-drive circuit for an inductively-loaded power switching transistor minimizes bias power drain by providing initial base current through a turn-on control transistor and then providing base drive current for the remainder of the power transistor's conduction interval by means of a diode coupled in series with a transformer winding regeneratively coupled to the collector-emitter current path of the power transistor. The turn-on control transistor is held off during this remaining conduction interval thereby reducing bias power drain. For power transistor turn-off, a complementary pair of control switches diverts base current drive and clamps the power transistor base to ground potential. The non-ideal turn-off characteristic of the diode is advantageously used to apply additional reverse potential across the base-emitter junction of the power transistor to effect carrier sweep-out for fast turn-off action. At the completion of power transistor turn-off, the complementary control switch pair is primed to eliminate the effects of any spurious noise potential appearing at the power transistor base resulting in improved noise margin for the non-conductive state.

4 Claims, 2 Drawing Figures

BASE DRIVE CIRCUIT

BACKGROUND OF THE INVENTION

1. Field of the Invention

This invention relates to drive circuits for providing conduction state control of inductively-loaded switching devices such as power transistors. More particularly, the invention relates to direct base drive circuits for power switching transistors in the inverter sections of DC-DC and DC-AC converter circuits.

2. Description of the Prior Art

Conduction control, or base-drive, circuits of the prior art generally fall within one of two classes—direct drive or indirect drive arrangements. Direct drive arrangements use conduction control elements directly coupled to the base of the power switch under control, while indirect drive arrangements use an intermediate transformer to couple the control circuitry to the base circuit of the power switch. Regardless of the direct or indirect coupling used, such base drive circuits of the prior art have been found to suffer from the problem of inefficient bias power drain during normal operation cycles. The increased bias drain results from base drive circuitry wherein at least one conduction controlling device is ON during the entire interval of conduction or non-conduction of the power switching device being controlled.

Known relevant examples of the prior art are shown in U.S. Pat. Nos. 3,610,963—Higgins, 3,657,569—Froeschle, 3,930,170—Burens et al., 3,983,418—Wallace, and 3,986,052—Hunter. Each of these references disclose bias drain through a switching control device after the initiation of one of the two power device conduction states, resulting in inefficient power loss during the normal course of operation of the base drive circuits.

In U.S. Pat. Nos. 3,610,963—Higgins, control transistor 10 of FIG. 1 is held conductive for the duration of the OFF state of controlled power transistor 38 causing DC bias drain from source 22 for the entire duration of the OFF state of transistor 38.

3,657,569—Froeschle discloses that control transistor Q1 of the single drawing FIGURE is conductive for the entire duration of the ON state of controlled transistor Q2 causing DC bias drain from source 21.

Similarly, 3,930,170—Burens et al. shows control transistor 10 of FIG. 1 conductive for the entire duration of the OFF state of controlled transistor 36, thus causing DC bias drain from source 72. Inefficient DC power loss can also be shown at control transistor Q2 of FIG. 1 of 3,983,418—Wallace and at control transistor 102 of FIG. 1 of 3,986,052—Hunter.

In addition to bias power losses, direct drive arrangements of the prior art suffer from current limitations in the base circuit of the device being controlled and require the addition of a large power diode to the emitter circuit of the controlled device to provide sufficient reverse base-emitter potential for effecting carrier sweep-out when turn-off is initiated.

SUMMARY OF THE INVENTION

An object of this invention is to provide a direct drive conduction state control circuit for an inductively-loaded power transistor having decreased bias power loss, economy of design, increased current handling capability, and improved noise margin for the OFF state of the power transistor.

Briefly summarizing the invention, means for controlling the conduction state of a power transistor comprise a turn-on control transistor switch for furnishing an initial base drive current to the power transistor, a transformer winding coupled via a diode across the base-emitter junction of the power transistor for disabling the turn-on control switch and for furnishing sustaining base drive current to the power transistor, and a pair of complementary turn-off control tansistor switches operative when enabled to divert base drive current from the base of the power transistor thereby initiating its turn-off. Bias power drain is minimized by rendering the turn-on control switch non-conductive after its initial current-furnishing time interval. The non-ideal dynamic characteristic of the diode in series with the transformer winding is used to supply additional reverse base-emitter potential to the power transistor to effect carrier sweep-out for fast power transistor turn-off action.

BRIEF DESCRIPTION OF THE DRAWING

The objects and features of the invention will become apparent from a reading of the detailed description of a preferred embodiment taken in conjunction with the drawing in which.

DETAILED DESCRIPTION

Figure 1:
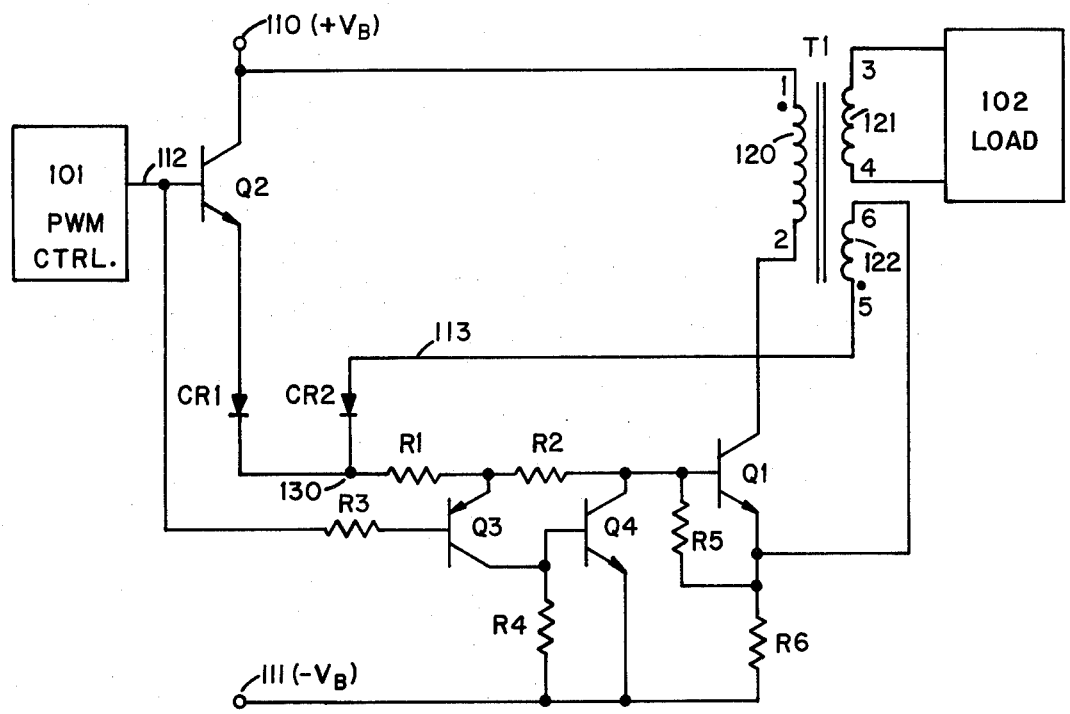
FIG. 1 depicts a schematic diagram of a base drive arrangement suitable for use in accordance with the principles of the invention.

An NPN power transistor Q1, whose conduction state is to be controlled in accordance with the invention, is shown in FIG. 1 as the power switching element of a conventional DC-to-AC inverter of the well-known "flyback" type. The collector of transistor Q1 is coupled to terminal 2 of primary winding 120 of inverter transformer T1, while the emitter of Q1 is coupled via resistor R6 to the negative return path of DC power source $V_B$ at terminal 111. The opposite terminal 1 of primary winding 120 is coupled to the positive output of DC source $V_B$ at terminal 110. Additionally, transistor Q1 has a resistor R5 coupled between its base and emitter electrodes.

Pulse width modulation control circuit 101 furnishes conduction state request signals at its output 112 which is coupled to the base of turn-on control NPN transistor Q2 and via resistor R3 to the base of a first turn-off control PNP transistor Q3.

The collector of transistor Q2 is coupled to terminal 110 of the DC supply $V_B$, while the emitter of Q2 is coupled via protection diode CR1 to node point 130.

In addition to its primary winding 120, inverter transformer T1 has a secondary winding 121 with terminals 3 and 4 coupled to a load 102 and a feedback winding 122 with a first terminal 5 coupled via control diode CR2 to node point 130 and a second terminal 6 coupled to the emitter of power transistor Q1.

Turn-off control transistor Q3 has its emitter coupled to node point 130 via resistor R1 and to the base of power transistor Q1 via resistor R2. The collector of transistor Q3 is coupled to the base of a second turn-off control transistor Q4 and via resistor R4 to the negative return path of DC power source $V_B$ at terminal 111.

Turn-off control NPN transistor Q4 has its collector coupled to the base of power transistor Q1 and its emitter coupled to the negative return path of DC power source $V_B$ at terminal 111.

Figure 2:
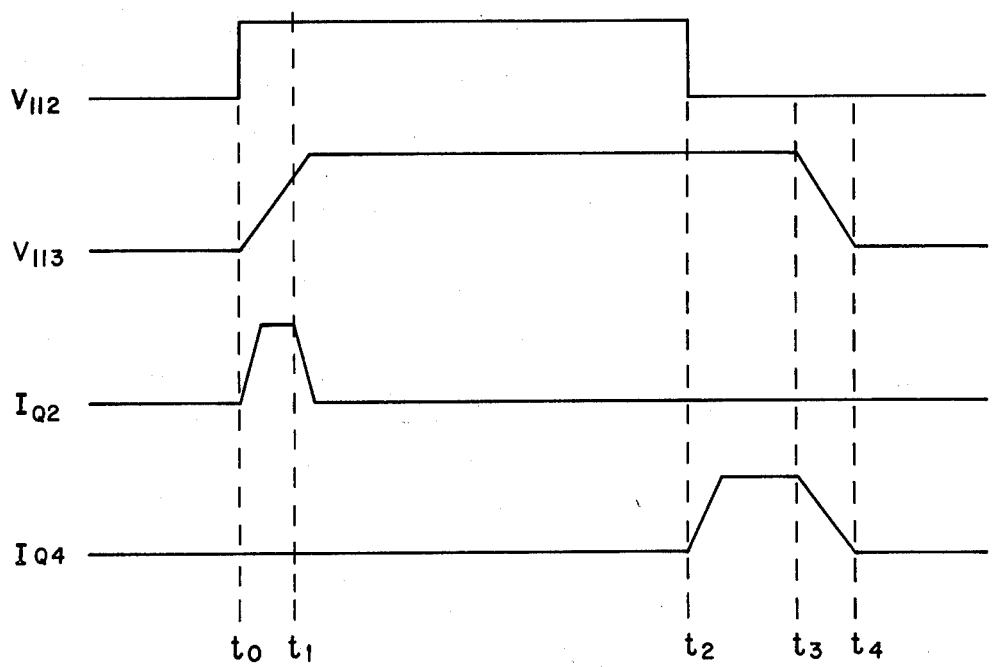
FIG. 2 shows the time relationship of various signals at pertinent points of the base drive circuit of FIG. 1.

The detailed operation of the conduction state control arrangement of FIG. 1 is best described with supplementary reference to the waveforms of FIG. 2. Waveforms of FIG. 2 labeled $V_{112}$ and $V_{113}$ refer to the voltages respectively appearing at paths 112 and 113 of FIG. 1, while waveforms $I_{Q2}$ and $I_{Q4}$ refer to current flow from collector to emitter of transistors Q2 and Q4, of FIG. 1, respectively.

Assume initially at a time prior to $t_0$ of FIG. 2 that power transistor Q1 is in the non-conductive, or OFF, state. At time $t_0$, FIG. 2, the pulse width modulation control circuit PWM CTRL 101 of FIG. 1, furnishes a turn-on request signal at output 112 comprising a positive-going voltage to render turn-on control transistor switch Q2 conductive. The details of PWM CTRL 101 are not shown as they are not essential to a teaching of the principles of the invention. PWM CTRL 101 is comprised of any suitable logic timing generation circuitry; and could, for example, consist of a simple astable multivibrator, well-known in the art, designed to produce the desired duty cycle of the inverter circuit.

When Q2 is rendered conductive at time $t_0$, base drive current to power transistor Q1 is furnished from terminal 110 of DC power supply $V_B$, through the low impedance collector-emitter path of Q2, through protection-diode CR1, thence through resistors R1 and R2 to the base electrode of Q1. This initial base drive current is shown as $I_{Q2}$ in FIG. 2. Simultaneously, at $t_0$, to the positive-going pulse at 112 renders PNP turn-off contol transistor Q3 non-conductive.

In response to the base drive current furnished via Q2, power transistor Q1 begins to conduct current from terminal 110 of $V_B$, through primary winding 120 of inverter transformer T1, through the collector-emitter path of Q1 to the return path of $V_B$ via resistor R6. As shown by the well-known dot convention at the windings of T1 of FIG. 1, current flow into terminal 1 of winding 120 will produce a potential across feedback winding 122 that is positive at terminal 5. Hence, as Q1 begins to conduct, the potential at path 113, connected to terminal 5 of winding 122, begins to rise. This potential is shown as $V_{113}$ in FIG. 2. At time $t_1$ of FIG. 2, $V_{113}$ has risen to a level higher than the potential $V_{112}$ by an amount sufficient to reverse bias protection diode CR1, thus inhibiting further current conduction through transistor Q2. The conductive state of Q1 is now sustained by the regenerative coupling arrangement between transformer windings 120 and 122, with base drive supplied via control diode CR2 and resistors R1 and R2.

Near the termination of the desired conduction interval for transistor Q1, shown as time $t_2$ in FIG. 2, a turn-off request signal is generated at output 112 of PWM CTRL 101 in the form of a negative-going potential, $V_{112}$ of FIG. 2. Negative-going $V_{112}$ renders first turn-off control PNP switching transistor Q3 conductive.

As Q3 begins conducting, the base drive supplied from inverter transformer feedback winding 122 over diode CR2 and resistor R1 is partially diverted through the emitter-collector path of Q3, resulting in the initiation of turn-off of power transistor Q1 and the turn-on of a second turn-off control NPN switching transistor Q4. Q4 then saturates to clamp the base of power transistor Q1 to the potential of the return path at terminal 111 for the DC supply $V_B$. Thus, the turn-off control switch means comprised of the tandem connection of turn-off control transistors Q3 and Q4 operates to divert the drive current from the base electrode of transistor Q1 and functions as a current sink for the sweep-out current of Q1.

During carrier sweep-out at Q1 the potential across feedback winding 122 collapses, and due to the reflected voltage from the load and the leakage inductance of the inverter transformer T1, the potential at dotted terminal 5 actually swings through zero to a negative level, thus reverse biasing control diode CR2 at time $t_3$ of FIG. 2 The carrier sweep-out requirements of CR2 itself adds to the turn-off speed of transistor Q1, because of the reverse bias potential resulting from base to emitter of Q1 via the feedback winding 122 of transformer T1.

At time $t_4$ of FIG. 2, turn-off control transistors Q3 and Q4 are non-conductive but are primed to respond to any spurious noise signals appearing in the base lead of power transistor Q1 by diverting any resultant current in the base circuit to the return path of DC supply $V_B$ thereby ensuring a more stable OFF condition for the power switching transistor Q1.

The description of the turn-on and turn-off operation of the illustrative embodiment shows that, because the control switching elements are conductive only temporarily at the initiation of turn-on or turn-off, bias power drain is reduced to a minimum.

It should be noted that the invention described has been illustrated with reference to a particular embodiment. Many details used to facilitate the description were chosen for convenience only and without limitation on the scope of the invention. Other embodiments may be devised by those skilled in the art without departing from the scope and spirit of the invention. For example, the protection diode CR1 is not theoretically required in the given embodiment if a switching transistor Q1 could be formed with suitable built-in base-emitter junction reverse break-down protection. Accordingly, the invention is intended to be limited only by the scope and spirit of the appended claims.

I claim:

1. In a power supply inverter circuit including a power transistor for intermittently coupling, via its collector-emitter circuit, a DC power supply to a primary winding of a transformer having a secondary winding coupled to a load circuit, means for controling the conduction state of the power transistor comprising;

pulse control means for furnishing at an output thereof turn-on and turn-off request signals, turn-on control switch means having an enabling input terminal coupled to the pulse control means output, a second terminal coupled to the DC power supply, and a third terminal coupled to the base electrode of the power transistor operative on receipt of a turn-on request signal at the enabling input terminal to coupled current from the DC power supply to the base electrode circuit of the power transistor, a feedback winding for the transformer, poled such that regenerative current coupling is provided between the transformer primary winding and the feedback winding, having a first terminal coupled to an emitter electrode of the power transistor and a second terminal coupled via a control diode to the base electrode circuit of the power transistor, the potential developed across the feedback winding upon initiation of power transistor turn-on being effective to render the turn-on control switch means nonconductive and to sustain power transistor conduction via the regenerative current coupling, and turn-off control switch means having an enabling input coupled to the pulse control means output, operative on receipt of a turn-off request signal to divert drive current from the base electrode of the power transistor thereby initiating turn-off.

2. A power supply inverter circuit as set forth in claim 1, wherein the turn-on control switch means further comprises;

a transistor having a base electrode coupled to the enabling input of the turn-on control switch means, a collector electrode coupled to the DC power supply, and an emitter electrode coupled via a protection diode to the base electrode circuit of the power transistor.

3. A power supply inverter circuit as set forth in claim 1, wherein the turn-off control switch means further comprises;

a PNP transistor having a base electrode coupled via a first resistor to the enabling input of the turn-off switch control means, an emitter electrode coupled to the base electrode circuit of the power transistor, and a collector electorde coupled via a second resistor to a return path for the DC power supply, and an NPN transistor having a base electrode coupled to the collector electrode of the PNP transistor, a collector electrode coupled to the base electrode circuit of the power transistor, and an emitter electrode coupled to the return path for the DC power supply.

4. A power supply inverter circuit comprising a DC power source having a positive output and a negative return path, an NPN power transistor, a transformer having a primary winding with a first terminal coupled to the positive output of the DC power source and a second terminal coupled to a collector electrode of the power transistor, a secondary winding coupled across a load circuit, and a feedback winding with a first terminal coupled to an anode electrode of a control diode and a second terminal coupled to an emitter electrode of the power transistor, the feedback and primary windings mutually-poled such that current flow into the first terminal of the primary winding induces current flow out of the first terminal of the feedback winding, a turn-on control NPN transistor having a base electrode coupled to a pulse width control means, a collector electrode coupled to the positive output of the DC power source, and an emitter electrode coupled to an anode electrode of a protection diode, a first resistor having a first terminal commonly coupled to the cathode electrodes of the protection diode and the control diode and a second terminal coupled to a base electrode of the power transistor via a second resistor, a turn-on control PNP transistor having a base electrode coupled to the pulse width control means via a third resistor, an emitter electrode coupled to the second terminal of the first resistor, and a collector electrode coupled to the return path of the DC power source via a fourth resistor, a turn-off control NPN transistor having a base electrode coupled to the collector electrode of the turn-off control PNP transistor, a collector electrode coupled to the base electrode of the power transistor, and an emitter electrode coupled to the return path of the DC power source, a fifth resistor coupled between the base and emitter electrode of the power transistor, and a sixth resistor coupled between the emitter electrode of the power transistor and the return path of the DC power source.

* * * * *